Aug. 19, 1924.   1,505,110
C. G. VON POST
WEIGHING MECHANISM
Filed Sept. 28, 1921   2 Sheets-Sheet 2
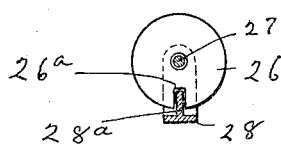
Fig. 4.
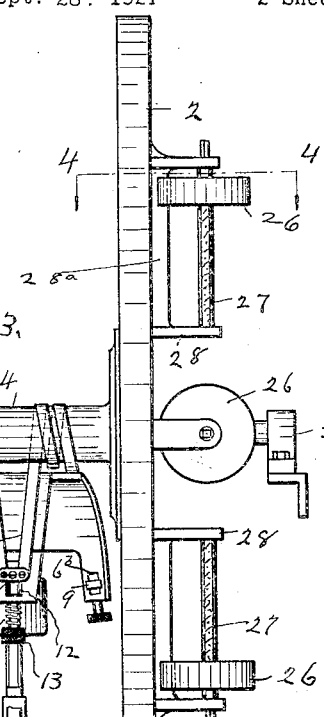
Fig. 3.
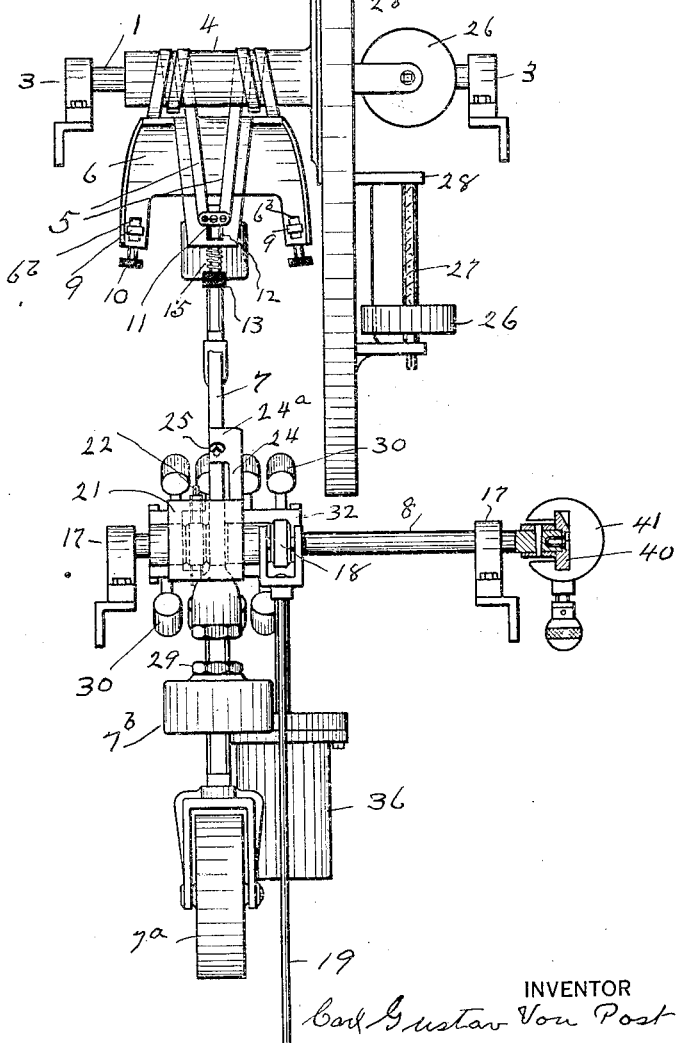
INVENTOR
Carl Gustav Von Post
BY
T. A. Bourne
ATTORNEY Patented Aug. 19, 1924.

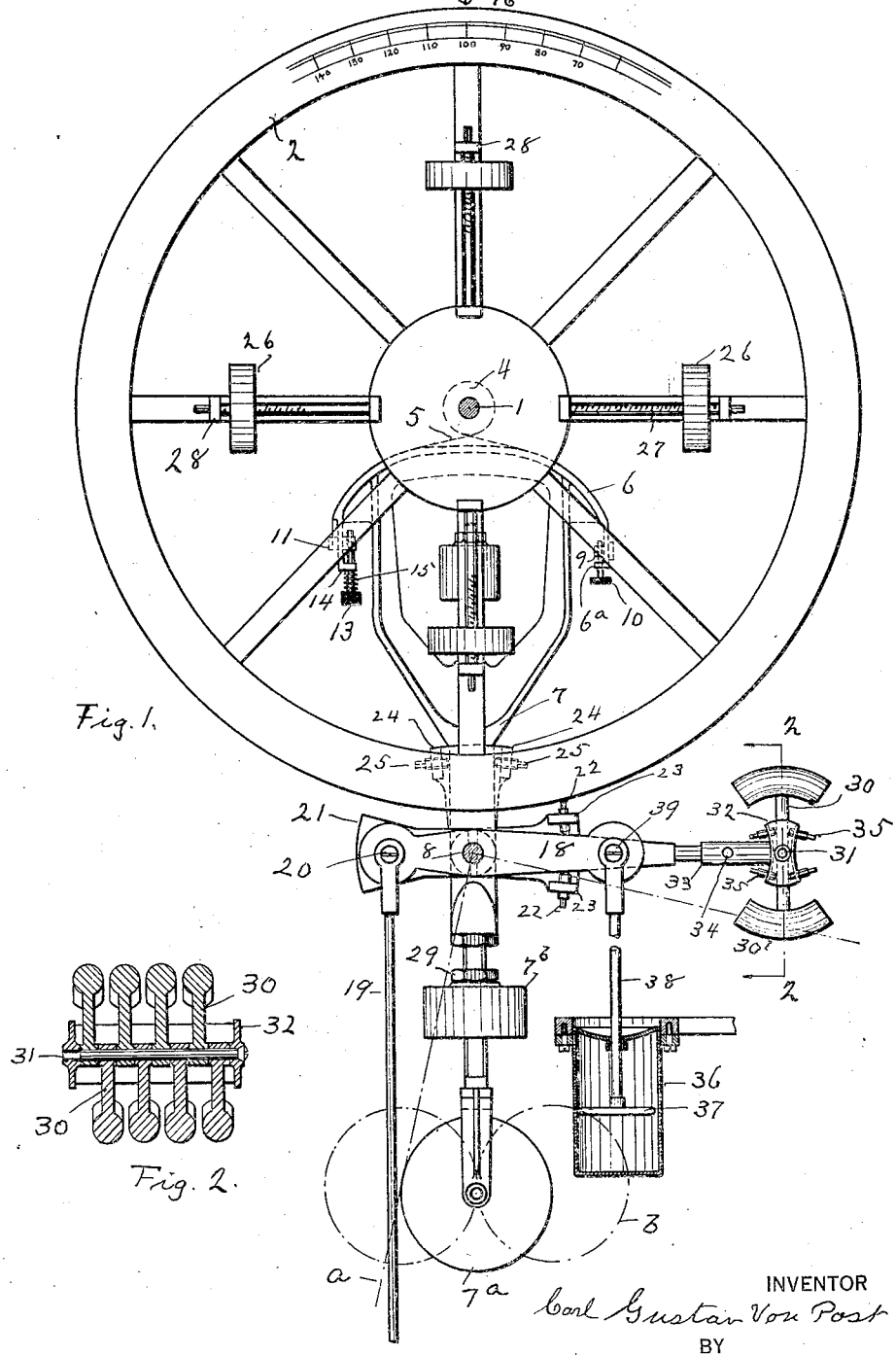

1,505,110

UNITED STATES PATENT OFFICE.

CARL GUSTAV von POST, OF STOCKHOLM, SWEDEN; ANNA von POST, EXECUTRIX OF SAID CARL GUSTAV von POST, DECEASED, ASSIGNOR TO AKTIEBOLAGET ORIGINAL-ODHNER, OF GOTTENBORG, SWEDEN, A CORPORATION OF SWEDEN.

WEIGHING MECHANISM.

Application filed September 28, 1921. Serial No. 503,949.

*To all whom it may concern:*

Be it known that I, CARL GUSTAV VON POST, a subject of the King of Sweden, and resident of Stockholm, Sweden, have invented certain new and useful Improvements in Weighing Mechanisms, of which the following is a specification.

The object of my invention is to provide means whereby accurate indication of the weight of each article being weighed will be shown, the accuracy of indication of weights being derived by reason of the construction inherent in my invention and without requiring special adjustment and individual manual correlation of operating parts to cause an indicator or dial accurately to show the weights, such as is frequently required where cams and gears are used between the weighing mechanism and the indicator shaft to cause operation of the indicator.

My invention comprises novel details of improvement that will be more fully hereinafter set forth and then pointed out in the claims.

Reference is to be had to the accompanying drawings forming part hereof, wherein Fig. 1 is a face view of a scale mechanism embodying my invention; Fig. 2 is a section on line 2, 2, in Fig. 1; Fig. 3 is a side view of Fig. 1, and Fig. 4 is a section on line 4, 4, in Fig. 3.

Similar numerals of reference indicate corresponding parts in the several views.

Upon a shaft 1 is secured a dial or other indicator 2, which shaft may be supported in bearings 3 adapted to be supported in any suitable casing or frame. Shaft 1 is enlarged or provided with a drum 4, around which flexible strips 5 are wound to extend at their ends in opposite directions. The strips 5 are shown wound so as to cross at the under side of drum 4, and said strips are wound diagonally or angularly upon said drum so that the convolutions of the strips will not engage, the strips crossing beneath the shaft. The ends of the strips 5 are attached to a curved member 6 carried upon a pendulating or rocking arm 7, supported below shaft 1 upon shaft 8. Corresponding ends of strips 5 are shown attached by means of nuts 9 to screws 10, carried by lugs 6$^a$ at one side of member 6, which nuts are slidable in slots 6$^b$ in member 6. The opposite ends of strips 5 are attached to nut 11 slidable in a slot 12 in the adjacent side of member 6, which nut receives a screw 13 that works in a lug 14 on member 6 and is retained in position by the pressure of spring 15 bearing between said lug and the head of said screw. The screw is free to slide in lug 14 to resist shocks that may be imparted to strips 5. The strips 5 operate freely upon the surface of member 6 between screws 10 and 13. The position of the dial or pointer may be adjusted by rotating the screws 10, and the relative positions of the strips 5 may be likewise adjusted by said screws, whereby said strips will operate accurately upon drum 4 and the dial may be brought to a definite position respecting the zero mark 16. The shaft 8 is journaled in suitable bearings 17, which may be supported in the adjacent casing in a position parallel to and beneath shaft 1. A horizontally disposed lever 18 is adapted to rock the arm 7 and may be connected with any suitable scale platform or pan (not shown) by means of a draft-rod 19, the lever 18 and rod 19 being suitably pivotally connected at 20. For the purpose of making accurate adjustments between arm 7 and lever 18 a head 21 is secured upon shaft 8 and provided with screws 22 carried by lugs 23 extending from head 21 on opposite sides of lever 18, so that by adjusting the screws 22 the position of said lever and head 21 may be adjusted and retained with relation one to another. The head 21 is also provided with upwardly extending arm 24 having lugs 24$^a$ on opposite sides of arm 7, which lugs are provided with screws 25 opposing said arm so that by adjusting the screws 25 the position of arm 7 with relation to head 21 and lever 18 may be adjusted. The adjustments provided by means of screws 22 and 25 permit positioning of arm 7 with relation to the scale platform or pan, the shaft 1 and the indicator 2.

Balancing of the dial or indicator member 2 may be effected by means of weights 26 carried by screws 27 working in said weights, which screws are rotatively disposed on brackets 28 carried by dial or indicator member 2. The brackets 28 are shown provided with ribs 28$^a$ receiving recesses 26$^a$ in the edges of weights 26, (Fig. 4), whereby said weights will not rotate when screws 27 are rotated. By the means described the weights 26 may be adjusted radially with respect to shaft 1 to accurately balance the indicator member 2. The lower part of arm 7 is shown provided with a weight 7ª and above said weight is an adjustable weight 7ᵇ, which may be held in adjusted position on arm 7 by nut 29. The lever 18 is provided with a plurality of weighted arms 30 radially disposed at the free end of said arm. Arm 17 carries a pin 31 on which a frame 32 is secured by means of its hub 33 and pin 34, which frame supports pin 31, (Fig. 1). Frame 32 is provided with screws 35 in bearings opposed to the respective arms 30. The screws 35 may be adjusted with respect to the arms 30 so that the radial or vertical positions of the latter with respect to arm 18 may be adjusted to provide for balancing or regulating the operative weight of arm 18 as may be desired. A dash-pot 36 having its piston 37 pivotally connected by rod 38 with lever 18, at 39, resists operation of lever 18 in a well known manner.

A tare beam 40 may be secured on shaft 8 and provided with a counterpoise 41.

The normal or zero position of arm 7 is indicated by the dotted line at *a* in Fig. 1, the intermediate position of said arm is indicated by the weight 7ª, and the extreme operative position for one rotation of shaft 1 and dial 2 is indicated by the dotted line *b* in Fig. 1.

When there is no weight upon the scale platform or pan the arm 7 will stand at the dotted position *a*, and when an article to be weighed is placed upon said platform or pan the draft-rod 19 will tilt lever 18 proportionally, which lever, through the rock arm 21, will rock the arm 7 accordingly and the strips 5 will cause rotation of shaft 1 and dial or indicator 2 to indicate the weight of the article. By means of the strips 5 and the curvilinear shape of the surface of member 6 upon which said strips operate the indicator or dial 2 will be operated. It will be observed that the working surface of member 6 is relatively flat at the top and gradually curved in outward directions correspondingly on opposite sides of a line passing longitudinally through member 7 in such a way that the said surface through the medium of strips 5 will impart to the dial or indicator 2 a rotation equal in graduation on the scale for each unit of weight, such as for each pound or fraction thereof. The arrangement is such that when the adjustments of the parts have been made by means of screws 10 and 13 as well as the adjustments for balancing such, as means of the screws 22, 25, and 35, the indicator or dial will be accurately positioned with respect to the zero point, and the shape of the working surface of member 6 will effect the desired operation of the dial or indicator in all positions without requiring filing or manipulation of the operating parts, as has been customary, so far as I am aware, with certain classes of automatic scales, utilizing a rack, with a pinion and cam to operate the rack.

Having now described my invention what I claim is:—

1. A weighing mechanism comprising an indicator having a shaft, straps extending in opposite directions with relation to said shaft, an arm having a member provided with a surface upon which said straps operate, said surface being substantially flat at the mid-portion and similarly curved outwardly on opposite sides of said mid-portion, and means to rock said arm.

2. A weighing mechanism comprising an indicator having a shaft, straps extending in opposite directions with relation to said shaft, an arm having a member provided with a surface upon which said straps operate, said surface being similar on opposite sides of said arm, means to rock said arm, and resilient means connecting adjacent ends of said straps to a side of said member.

3. A weighing mechanism comprising an indicator having a shaft, straps extending in opposite directions with relation to said shaft, an arm having a member provided with a surface upon which said straps operate, said surface being similar on opposite sides of said arm, and means to rock said arm, screws adjustably connecting said strips to one side of said member, and resilient means connecting the other ends of said strips to the adjacent side of said member.

4. A weighing mechanism comprising a dial having a shaft, strips wound in opposite directions around said shaft and crossing beneath the same, a rock arm below the shaft and provided with a member at its upper end having a surface curved similarly on opposite sides of said arm, means attaching the ends of said strips to corresponding sides of said member, and means to rock said arm.

5. A weighing mechanism comprising a dial, means rotatively supporting the dial, means to actuate the dial according to the weight of an article being weighed, a plurality of weights, screws carried radially by said dial and cooperative with said weights to retain them in adjusted position on the dial.

6. A scale mechanism comprising an indicator, a rock arm, means operatively connecting said indicator and arm, a lever for operation by articles being weighed, a head to operate said arm, and screws cooperative between said head and lever to adjust and retain them operatively together.

7. A scale mechanism comprising an indicator, a rock arm, means operatively connecting said indicator and arm, a lever for operation by articles being weighed, a head operatively connected with said lever, and screws cooperative between said head and arm to adjust and retain them operatively together.

8. A scale mechanism comprising an indicator, a rock arm, means operatively connecting said indicator and arm, a lever for operation by articles being weighed, and means connecting said lever and arm, adjustable weights carried by said lever, and means to retain said weights in adjusted positions on said arm.

9. A scale mechanism comprising an indicator, a rock arm, means operatively connecting said indicator and arm, a lever for operation by articles being weighed, and means connecting said lever and arm, a frame carried by said lever, weights movably carried by said frame, and screws carried by said frame to retain said weights in adjusted positions.

10. A scale mechanism comprising an indicator, a rock arm, means operatively connecting said indicator and arm, a lever for operation by articles being weighed, and means connecting said lever and arm, a frame carried by said lever, a pin carried by the frame, weights journaled on the pin and extending radially in opposite directions, and screws carried by said frame to retain said weights in adjusted positions.

Signed at Gottenborg, in the county of Gottenborg and Bohns and State of Sweden this 9th day of September A. D., 1921.

CARL GUSTAV von POST.